UNITED STATES PATENT OFFICE.

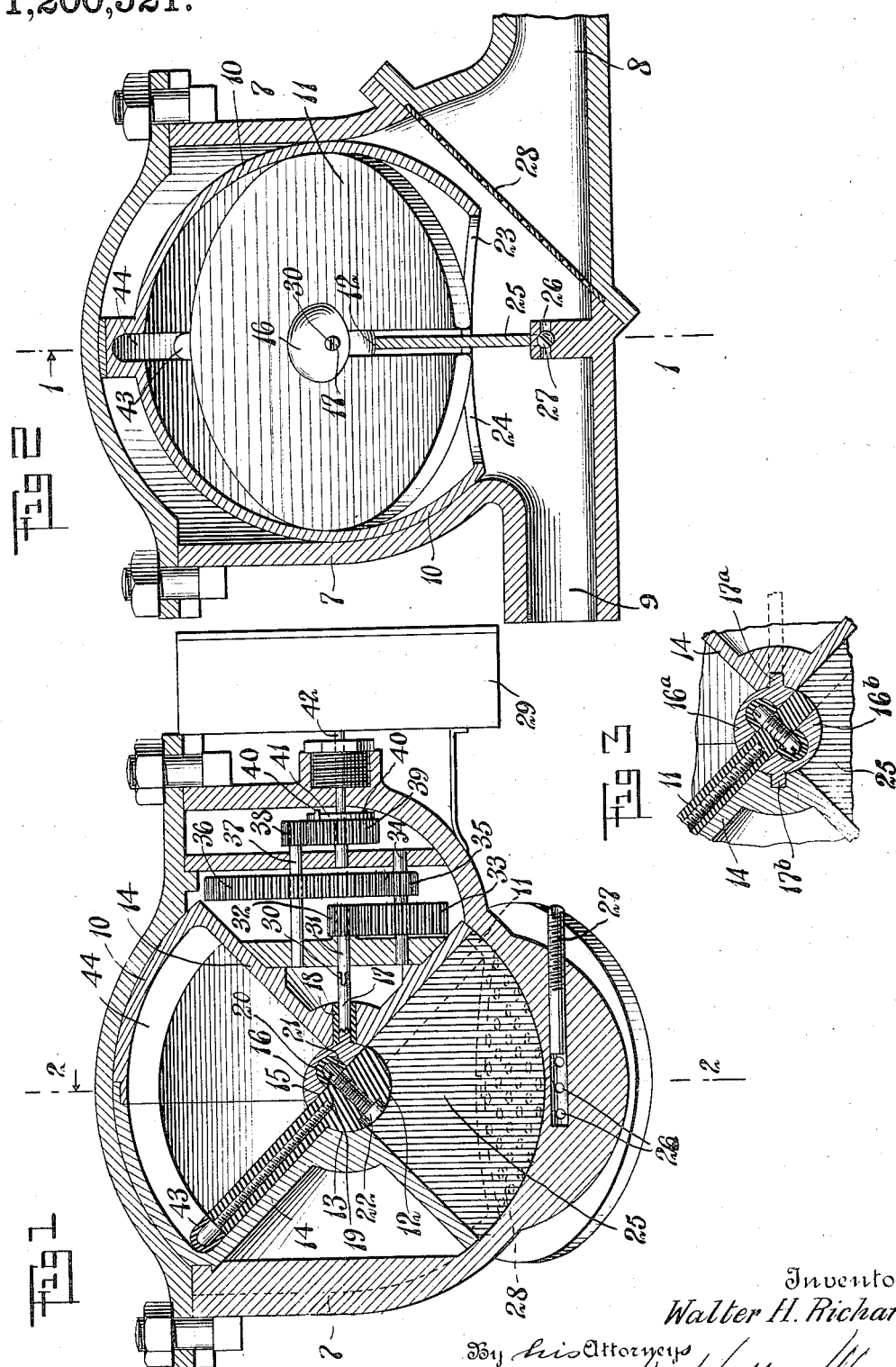

WALTER H. RICHARDS, OF NEW LONDON, CONNECTICUT.

LIQUID-METER.

1,200,521.  Specification of Letters Patent.  Patented Oct. 10, 1916.

Application filed April 26, 1916. Serial No. 93,599.

*To all whom it may concern:*

Be it known that I, WALTER H. RICHARDS, a citizen of the United States of America, residing at New London, Connecticut, have invented a new and useful Liquid-Meter, of which the following is a specification.

My present invention relates to liquid meters generally and is in some respects in the nature of an improvement on the invention disclosed and claimed in my copending application Serial No. 46,434, filed August 20, 1915, particular objects of this invention being to provide simplified and improved mechanism for maintaining the nutatory disk in its tilted position and to avoid the use of openings for such mechanism in the partition between the inlet and outlet sides of the meter.

Other objects are to simplify the mechanism for operating the registering mechanism or other mechanism to be operated and give a continuous motion to the same, while maintaining a wide angle movement of the disk.

In the accomplishment of the foregoing and other objects I employ, in a preferred construction, a spherical segment or zone mounted to rotate in a bearing socket and engaging the face of the disk whose opposite face is provided with or engaged by a spherical bearing segment working in a bearing socket opposite the first bearing socket. Proper engagement of the controlling segments with the disk is usually provided by projecting studs on the disks engaging in seats in the segments.

The controlling segment may be utilized solely as a controlling means for maintaining the disk in tilted position by having a projecting stud or post on the controlling segment turning in a bearing provided in the bearing socket but the rotary movement of this segment may be utilized for driving the registering mechanism in which case the post is extended through the inner casing into engagement with coöperating means forming a part of the registering mechanism.

Other features and details of construction will appear as the specification proceeds, attention being directed to the accompanying drawing forming a part hereof and wherein I have illustrated the invention embodied in a practical and preferred form.

In this drawing: Figure 1 is a transverse sectional view taken through a meter embodying the invention and substantially on the plane of the line 1—1 of Fig. 2. Fig. 2 is a longitudinal sectional view of the same taken substantially on the plane of the line 2—2 of Fig. 1. Fig. 3 is a broken sectional view illustrating the use of controlling segments on both sides of the disk.

In the particular construction illustrated the body of the meter is made up of an outer casing 7 forming a housing and provided with an inlet 8 and an outlet 9 and an inner casing 10 mounted within said housing and providing the metering or measuring chamber. Within the measuring chamber is located the disk 11, said disk in the first instance illustrated being mounted upon or provided with a bearing projection 12 in the form of a segment of a sphere, working in a bearing socket 13 carried by one of the conical side walls 14 of the measuring chamber. The side of the disk opposite that side at which this segmental bearing projection is provided, is preferably left substantially flat as indicated at 15 and engaging with its relatively flat surface is a controlling member, here shown in the form of a segment 16 of a sphere mounted upon and carried by a shaft or post 17 rotating in a bearing socket 18, the axis of rotation of said controlling segment corresponding with the center of oscillation of the nutatory element and in line with the center about which the spherical bearing segment is described. This spherical controlling segment thus constitutes in effect a controlling arm extending at an oblique angle from the end of the shaft which carries it and resists the thrust of the disk. This construction may be duplicated on the other side of the disk, if desired, as indicated in Fig. 3, where 16ª and 16ᵇ indicate controlling segments bearing on opposite sides of the disk and mounted on the studs or posts 17ª and 17ᵇ respectively. In both the constructions it will be noted the disk is confined between bearing segments, in the first case one only of these segments having an independent rotary movement and in the second form both bearing segments having rotary movement independent of the disk.

A positive means of engagement between the nutatory element and the controlling segment or segments is provided in the present disclosure in the form of a stud 19 projecting from the face of the disk and engaging in a socket or seat 20 in the face of the controlling segment, a friction reducing cup or bushing 21 of hard rubber or the like being preferably interposed at the point of engagement between these parts. This projecting stud is shown in the first form as a screw bolt threaded in through the center of the disk and the ball segment and provided with a lock nut 22 on the end thereof, the opposite, outer or working end of the stud being preferably rounded off as indicated and set at a point to relieve the friction between the controlling segment and the disk.

The measuring chamber is provided with an inlet 23 in communication with the inlet side of the meter housing and with an outlet 24 in communication with the outlet side thereof, the inlet and outlet sides of the chamber being separated by a partition 25. This partition may be provided with a series of leakage ports 26 extending therethrough and adapted to be opened or closed by means of a valve such as the screw plug 27. The opening or closing of these ports 26 permits a greater or lesser amount of leakage from the inlet side of the meter direct to the outlet side thereof and so can be used to accurately vary at will the rate of registration of the meter. The liquid may be screened before it enters the meter chamber as by means of a suitable screen 28 located in the intake side of the meter.

From the foregoing it will be apparent that the liquid entering the measuring chamber will exert its force to rock the disk upon its bearing segment or segments and as the controlling segments hold the disk tilted always with its opposite faces in engagement with opposite portions of the conical side walls the disk is confined to a nutatory movement. The controlling segment or segments serve also to assist in the centering of the disk and to take up the thrust of the disk. The ball segments may be made sufficiently large to provide the necessary bearing surfaces without changing the action of the mechanism.

A special advantage of the construction disclosed is that the disk may be made to vibrate through an angle of ninety degrees or more, thus giving the meter exceptionally large capacity for its size.

Suitable registering mechanism such as indicated at 29 may be provided and this registering mechanism may if desired be operated from the peripheral portion of the disk, as disclosed and claimed in my application above referred to. I may however, and this would be especially desirable for relatively small meters, drive the registering mechanism directly from the rotating controlling segment. To this end I have illustrated the pivot shaft 17 of the controlling segment in Figs. 1 and 2 as extended out through the side wall of the meter chamber and there coupled at 30 with the shaft 31 forming the first element of a train of gearing connected with the register. In the specific form shown the first shaft 31 carries a pinion 32 engaging a gear 33 on the shaft 34 which in turn carries a pinion 35 meshing with the gear 36 on a shaft 37, said latter shaft bearing a pinion 38 meshing with a gear 39 carrying pins 40, engaging a cross-arm 41 on the inner end of the register shaft 42. This train of intermediate gears may of course be varied to suit particular units of measurement desired. The disk may be guided and held against rotation by providing it with a guide roll 43 on its peripheral portion working in a guide slot 44 in the top of the measuring chamber.

The "wide-angle" construction of the meter, in addition to providing greatly increased capacity, means a considerable saving in the use of materials and the economy of the device is further increased by reason of the fact that the device is simple in design and consists of but few parts which can be readily and cheaply manufactured.

What I claim is:

1. In a liquid meter the combination of a nutatory disk, a centrally located stud engaged in said disk having an exposed substantially hemispherical head at one side of the disk, a spherical segment having a substantially hemispherical socket receiving the substantially hemispherical head of the stud and a shaft forming a spherical support for said segment.

2. In a liquid meter the combination of a nutatory disk, a centrally located stud engaged in said disk having an exposed substantially hemispherical head at one side of the disk, a spherical segment having a substantially hemispherical socket receiving the substantially hemispherical head of the stud and a cupped bushing seated in the substantially hemispherical socket in the segment and receiving the substantially hemispherical head of the stud.

3. A liquid meter comprising a meter casing provided with opposed bearing sockets, spherical segments working in said sockets, a nutatory disk confined between said segments and a stud mounted on said disk and having a bearing against one of the segments said stud having a screw engagement in the disk whereby said stud may be rotated to spread the segments apart and so compensate for wear between the segments.

4. In a liquid meter a nutatory disk, a threaded stud engaged in the central portion of the disk having an exposed rounded head at one side of the disk, a lock nut engaging the threaded end of the stud at the opposite side of the disk and a spherical segment receiving the exposed head of the stud.

5. In a liquid meter, a nutatory disk having one flat face and a centrally located bearing segment on its opposite face, a threaded stud engaged in the central portion of the disk having a rounded head exposed on the flat side of the disk and a threaded shank projecting through the bearing segment on the opposite side of the disk, a lock nut engaged with said threaded shank having an outer surface corresponding to the curvature of the bearing segment and a rotatably supported spherical segment having a socket receiving the rounded head of the stud aforesaid.

6. In a liquid meter, a nutatory disk, a meter casing having a chamber receiving said disk and a closed slot in one side thereof, a thrust receiving and guiding roller journaled on the rim of said disk and working in said slot, said roller having a substantially hemispherical bearing end engaging the end and side walls of said slot to guide the disk and take the thrust thereon.

WALTER H. RICHARDS.